Patented June 23, 1936

2,045,161

UNITED STATES PATENT OFFICE 2,045,161

CELLULOSE ACETATE PRODUCTS AND
METHOD OF PRODUCING SAME

Richard Müller and Martin Schenck, Mannheim, and Wilhelm Wirbatz, Mannheim-Waldhof, Germany, assignors to C. F. Boehringer & Soehne G. m. b. H., Mannheim-Waldhof, Germany No Drawing. Application March 13, 1931, Serial No. 522,510. In Germany March 21, 1930

12 Claims. (Cl. 18—54)

Our invention refers to the manufacture of products made from cellulose acetate and more particularly to the manufacture of artificial silk, films, plastic masses, varnishes and the like.

It is an object of our invention to provide a composition of the kind aforesaid which displays particularly valuable properties, especially with regard to stability, resistance against water and moisture, and lustre. Another object of our invention is to provide a method of producing such products in a simpler and more efficient manner than was hitherto possible.

During a considerable period of time the manufacture of artificial products with the aid of cellulose acetate could not compete with the manufacture of these products from nitrocellulose, viscose and ammoniacal copper oxide cellulose, respectively. This was obviously due to the fact that at this time only the so-called "primary" acetylation products of cellulose were known, which are sometimes termed "cellulose triacetates" or "chloroform-soluble cellulose acetates". These products, though far less inflammable than nitrocellulose, were then difficult to be treated in view of the high toxicity of the required solvents. Moreover, the products thus obtained were inferior to similar products with respect to their physical and chemical properties, and far less stable. On the other hand the acetylation itself was highly expensive in view of the great excesses of acetic acid and acetic anhydride required, these substances being recovered, after the precipitation of the dissolved cellulose acetate, in the form of a diluted solution the concentration of which was connected with considerable expense. This manufacture was therefore abandoned, when the hydrolytic transformation products of the cellulose triacetates, viz. the so-called "diacetates" or "acetone-soluble", or "secondary" cellulose acetates were discovered, which lend themselves to treatment more readily and advantageously.

The difference in the stability of the primary and secondary acetylation products of cellulose is apparently due to the presence, in the primary acetylation products, of components causing decomposition. More particularly the formerly used catalysts, such as sulfuric acid, employed in the acetylating reaction are supposed to partly remain in the obtained product in some linked form, this linkage being resolved when the triacetate is transformed into the so-called diacetate by means of a hydrolytic reaction, whereupon the obnoxious components, which would cause decomposition later on, may be removed by carefully washing or rinsing the product. In consequence thereof the diacetate is much more stable than the triacetate, which retains part of the catalyst.

As a fact the secondary acetylation product of cellulose is nowadays the only one used in the manufacture of artificial silk and the like, the primary acetate being only an intermediate product in the production of the diacetate.

Our invention is based on the discovery, that products, such as artificial silk, films, plastic masses and varnishes of an excellent quality may be obtained from the primary triacetate of cellulose without subjecting it to a hydrolytic decomposition so as to form the secondary diacetate therefrom, provided that a triacetate is used which is free of such catalytic components which might cause decomposition later on. We obtain such triacetate by carrying out the acetylation of the cellulose without using catalysts, such as sulfuric acid, which might remain, in a linked form, in the cellulose acetate and which cannot be removed substantially completely by washing while in the fibriform phase. We employ perchloric acid or a perchlorate as catalyst, having found that these compounds do not possess the deleterious action which we seek to avoid. Moreover, we maintain the fibrous structure of the original cellulose product throughout the acetylating reaction, because we have ascertained that only in doing so it is possible to readily and safely remove by washing all the catalysts and other contaminations which might cause decomposition.

The method of producing such particularly stable cellulose triacetate consists, simply spoken, in carrying out the acetylating reaction in the absence of sulfuric acid or other catalysts which might be retained in and cause decomposition of the product obtained. We replace these catalysts by others which do not exert such obnoxious influence. Care should be taken to maintain throughout the acetylating reaction the fibrous structure of the original cellulose. As a rule we treat the cellulose with the acetylating liquor until a sample of the product displays a satisfactory solubility in chloroform or in a mixture of 9 parts chloroform and one part ethyl alcohol whereupon the product is pressed to remove most of the liquor and is carefully washed with water in order to completely remove any traces of the catalyst employed.

In accordance with our invention we do not subject the primary acetylation product thus obtained to the hydrolytic decomposition as usual in the production of the secondary acetylation product therefrom, but we immediately further treat the primary product in order to make artificial products therefrom, such as silk, films, plastic masses and varnishes.

In order to make artificial silk we dissolve the dried fibrous triacetate in a suitable solvent, from which silk is spun thereafter by means of a spinning machine as usual in the art. Coagulation may be brought about by means of a coagulating bath, but if low boiling solvents are used, a dry spinning method may readily be employed. The product thus obtained displays all the advantageous properties stated above, such as a particularly good resistance against moisture, a high tensile strength and a fair lustre. In a similar way clear films for photographic or wrapping purposes may be made of the dry fibrous triacetate having the particular properties as stated above, no hydrolytic decomposition step being inserted between the recovery of the triacetate and the preparation of the coagulable solution thereof. Tests made upon artificial silk filaments made by the process of our invention show a dry strength of the order of 1.63 grams per denier with a wet strength of about 1.33 grams per denier. The relative wet strength is of the order of 80 to 82 per cent. The stretch is about 21 per cent.

The step of hydrolytically decomposing or partially saponifying the primary cellulose acetate is also suppressed in the production of plastic masses and of varnishes, which are obtained by mixing the triacetate with softening agents, such as salicylic acid nitril, p-toluene sulfonamide or by dissolving it in a suitable solvent, respectively.

Our invention is more fully illustrated by the following examples:

*Example 1*

100 parts cellulose are submerged in glacial acetic acid. After four hours digestion most of the liquid is removed by centrifuging, whereupon the cellulose thus treated is introduced into an acetylating mixture, which has been cooled down to about 5° C. and consists of 315 parts by weight of a 90–91% acetic anhydride, 363 parts acetic acid, 705 parts toluene and 1 part of a 70% solution of perchloric acid. The acetylating reaction is carried through at a temperature slowly increasing up to 20–25° C. When samples of the fibres are shown to be soluble in a mixture of 9 parts chloroform and 1 part ethyl alcohol, all the fibres are separated from the acetylation mixture by centrifuging, whereupon they are carefully washed with water and dried. They now show a fair woolly appearance and substantially consist of cellulose triacetate.

10–20 parts of the cellulose acetate thus obtained are dissolved in 90–80 parts of a mixture of 9 parts methylene chloride and 1 part ethyl alcohol. The solution is filtered under pressure and artificial silk is spun therefrom as usual.

*Example 2*

100 parts cotton are preliminarily treated with acetic acid as described with reference to Example 1. After centrifuging the fibres are introduced into an acetylating liquor consisting of 400 parts of a 90% acetic anhydride, 150 parts acetic acid, 550 parts cyclohexanol acetate and 15 parts zinc perchlorate. The acetylation reaction is carried through at a temperature ranging between 20–30°. When samples of the fibres are shown to be soluble in a mixture of chloroform and ethyl alcohol, all the fibres are separated from the acetylation liquor and are washed and dried. The product thus obtained is dissolved in a five-fold quantity of a solvent consisting of 92% methylene chloride and 8% methyl alcohol and artificial silk is spun from this solution in the usual manner.

Alternatively 3 parts of the cellulose acetate may be mixed with 1 part of a softening agent, such as salicylic acid nitril, in order to produce a plastic mass.

The various products obtained in accordance with our invention display all the advantageous properties stated above and moreover a high stability even at elevated or tropical temperatures or when exposed to sun light or moisture. As stated previously, our products are of the primary or triacetate type, being soluble in chloroform-alcohol mixtures and being substantially soluble in methylene chloride. This is in contrast to the acetone solubility of the so-called diacetates or secondary cellulose acetates. The term "shaped article" used in this specification and in the claims annexed to it is intended to designate threads such as artificial silk, films for photographic and other purposes, for instance for use in the construction of safety glass, but also lacquers, varnishes and the like.

Various changes may be made in the details disclosed in the foregoing specification without departing from the invention or sacrificing the advantages thereof.

We claim:—

1. In the manufacture of shaped articles of cellulose acetate, the process which comprises acetylating cellulose while in fibrous form to a primary, chloroform soluble acetylation product by employing an acetylation mixture capable of holding the cellulosic material in fibrous form; the said acetylation mixture comprising a chlorine-containing catalyst selected from a group consisting of perchloric acid, and the perchlorates, and being free from catalysts partly remaining in linked form in the non-hydrolyzed product and causing instability thereof; washing the resulting acetylation product while in the fibriform phase substantially free from traces of catalytic material, drying the product without previous hydrolytic decomposition, dissolving the dry product in a solvent and forming it into a shaped finished article by removing the solvent.

2. The process of claim 1 wherein the catalyst employed is perchloric acid.

3. The process of claim 1 wherein the catalyst employed is a perchlorate.

4. The process of claim 1 wherein the shaped article formed is artificial silk.

5. The process of claim 1 wherein the shaped article formed is a film.

6. The process of claim 1 wherein the shaped article formed is a plastic.

7. In the manufacture of shaped articles of cellulose acetate, the process which comprises acetylating cellulose while in fibrous form to a primary acetylation product by employing an acetylation mixture containing a perchlorate catalyst, separating the fibres from the acetylation mixture by a mechanical operation, selected from such methods as centrifuging and pressing, washing the fibres substantially free from catalytic material, drying the product without previous hydrolytic decomposition, dissolving the dry product in a solvent and forming it into a shaped finished article by removing the solvent.

8. A shaped manufactured article of the primary, non-hydrolyzed acetylation product of cellulose; being substantially soluble in methylene chloride; being substantially free from traces of catalysts; being highly stable over long periods of time and when exposed to tropical temperatures or to sun light; having a high resistance to moisture and being free from shrinking when dried, and, when in the form of filaments, having a relative wet strength of the order of 80 to 82 per cent, a dry strength of the order of 1.63 grams per denier and having a satisfactory lustre.

9. A shaped manufactured article of the primary, non-hydrolyzed acetylation product of cellulose, being substantially soluble in methylene chloride; being substantially free from traces of catalysts; being highly stable over long periods of time and when exposed to tropical temperatures or to sun light; having a high resistance to moisture and being free from shrinking when dried, and, when in the form of filaments having a relative wet strength of the order of 80 to 82 per cent, a dry strength of the order of 1.63 grams per denier and having a satisfactory lustre; the said primary acetylation product being formed by acetylating cellulose while in fibrous form by means of an acetylation mixture comprising a chlorine-containing catalyst selected from a group consisting of perchloric acid, and the perchlorates, washing the resulting primary acetylation product while in the fibriform phase substantially free from traces of catalytic material and drying, without hydrolytic decomposition of the primary cellulose acetate.

10. The product of claim 8 wherein the shaped, manufactured article is artificial silk.

11. The product of claim 8 wherein the shaped, manufactured article is in the shape of a film.

12. The product of claim 8 wherein the shaped, manufactured article is a plastic.

RICHARD MÜLLER.
MARTIN SCHENCK.
WILHELM WIRBATZ.